US012680811B1

(12) United States Patent

Shepherd et al.

(10) Patent No.: US 12,680,811 B1

(45) Date of Patent: Jul. 14, 2026

(54) APPARATUS AND METHOD FOR MEASURING SHAPE OF UNDERWATER TOW CABLES

(71) Applicant: The United States of America, as represented by the Secretary of the Navy, Arlington, VA (US)

(72) Inventors: Stephen Shepherd, Arlington, VA (US); Christopher Bradner, Herndon, VA (US); Damien Bretall, Bethesda, MD (US); Roger Kleinmann, Berwyn Heights, MD (US); Alexander S. Tsarev, North Potomac, MD (US); Christopher M. Nunes, Cabin John, MD (US); Kedric C. Eisenberg, Winchester, VA (US)

(73) Assignee: The United States of America, represented by the Secretary of the Navy, Washington, DC (US)

( * ) Notice: Subject to any disclaimer, the term of this patent is extended or adjusted under 35 U.S.C. 154(b) by 331 days.

(21) Appl. No.: 18/610,373

(22) Filed: Mar. 20, 2024

(51) Int. Cl.
G01B 21/20 (2006.01)
B63B 21/66 (2006.01)

(52) U.S. Cl.
CPC ............ G01B 21/20 (2013.01); B63B 21/663 (2013.01)

(58) Field of Classification Search
CPC .............................. G01B 21/20; B63B 21/663
See application file for complete search history.

(56) References Cited

U.S. PATENT DOCUMENTS

| | | | | |
|---|---|---|---|---|
| 3,899,991 | A | * | 8/1975 | Chatten ................. B63B 21/663 |
| | | | | 114/243 |
| 5,095,841 | A | * | 3/1992 | Santos .................... B63B 22/18 |
| | | | | 441/3 |
| 6,016,286 | A | * | 1/2000 | Olivier ................... B63B 21/66 |
| | | | | 367/16 |
| 6,837,175 | B1 | * | 1/2005 | Gieseke ................ B63B 21/663 |
| | | | | 114/242 |
| 8,183,868 | B2 | | 5/2012 | Summerfield |

(Continued)

OTHER PUBLICATIONS

Vandana RK, Finite Element Analysis of Under Water Towed Cables, International Journal of Innovative Research in Science, Engineering and Technology An ISO 3297: 2007 Certified Organization, vol. 2, Special Issue 1, Dec. 2013 Proceedings of International Conference on Energy and Environment-2013 (ICEE 2013) On 12th to 14th December 12-14, 2013, ISSN 2319-8753 (Online), 2347-6710 (Print).

*Primary Examiner* — Francis C Gray

(74) *Attorney, Agent, or Firm* — Jesus J. Hernandez; U.S. Department of the Navy, Office of the General Counsel

(57) ABSTRACT

Example embodiments provide a cable measuring apparatus and method comprising a cable and a fairing system. The cable may be configured to be connected at opposite ends in a marine environment, wherein one connection provides a stabilizing force in order to allow the cable to form a catenary in response to the stabilizing force interacting with currents in the marine environment. The fairing system may be connected to the cable about its length, the fairing system comprising a plurality of fairing units, at least one of the plurality of fairing units being an instrumented replacement fairing unit. The instrumented replacement fairing unit may be configured to record measurements of at least the catenary when subjected to the stabilizing force.

17 Claims, 9 Drawing Sheets

(56)  References Cited

U.S. PATENT DOCUMENTS

| 8,437,979 | B2 | | 5/2013 | Frank | |
|---|---|---|---|---|---|
| 8,675,446 | B2 | | 3/2014 | Gateman | |
| 9,766,360 | B2 | | 9/2017 | Schneider | |
| 9,778,388 | B1 | | 10/2017 | Connor | |
| 10,000,263 | B2 | | 6/2018 | Farber | |
| 11,554,838 | B1 | * | 1/2023 | Kleinmann | B63G 8/001 |
| 2014/0165898 | A1 | | 6/2014 | Cierpka | |
| 2017/0233040 | A1 | * | 8/2017 | Martin | B63B 21/663 |
| | | | | | 367/17 |
| 2018/0244351 | A1 | * | 8/2018 | Warnan | B66D 1/36 |
| 2018/0244352 | A1 | * | 8/2018 | Warnan | B66D 1/36 |
| 2020/0198738 | A1 | * | 6/2020 | Hauge | B63B 21/663 |

* cited by examiner

S-90

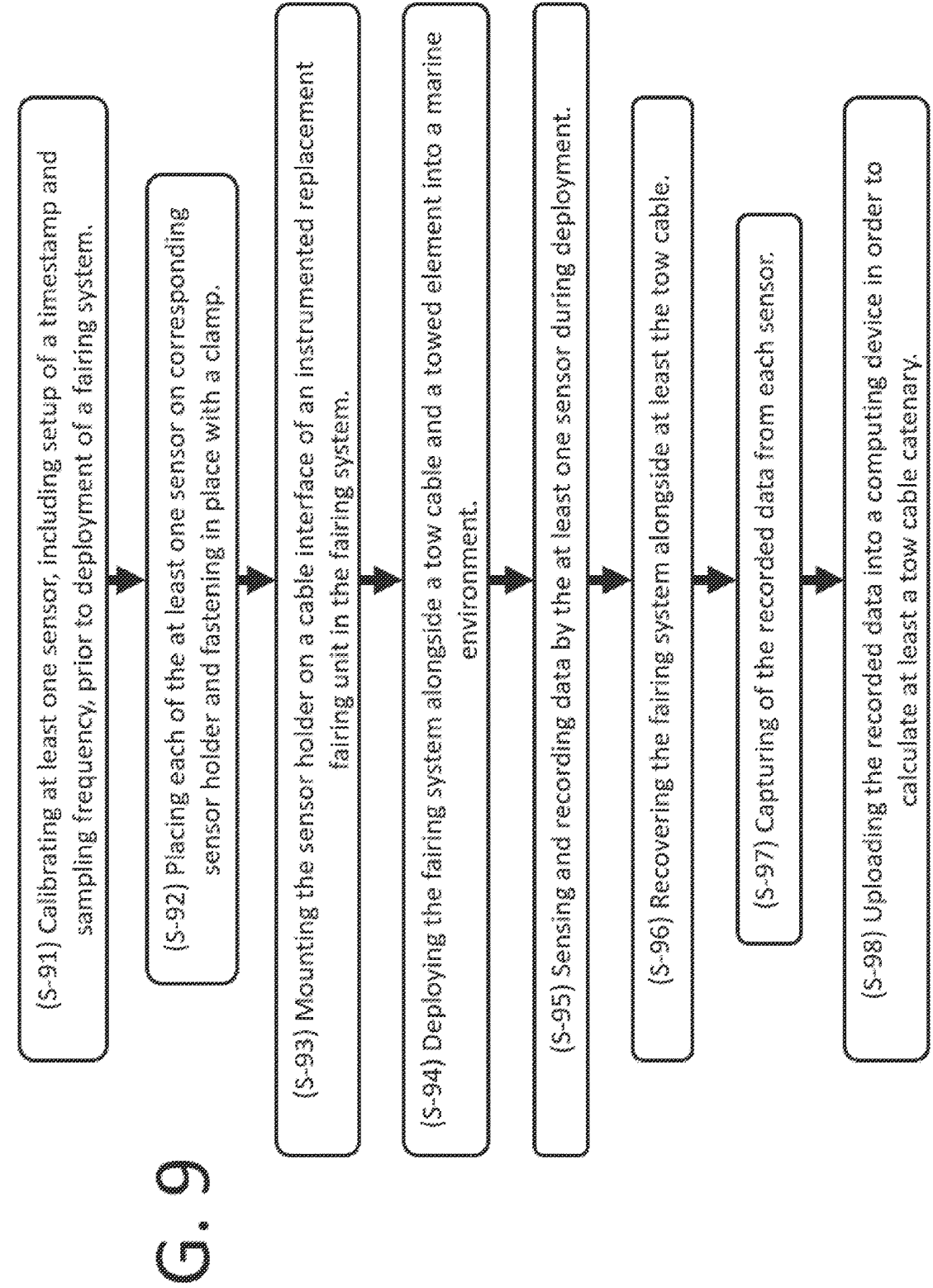

(S-91) Calibrating at least one sensor, including setup of a timestamp and sampling frequency, prior to deployment of a fairing system.

(S-92) Placing each of the at least one sensor on corresponding sensor holder and fastening in place with a clamp.

(S-93) Mounting the sensor holder on a cable interface of an instrumented replacement fairing unit in the fairing system.

(S-94) Deploying the fairing system alongside a tow cable and a towed element into a marine environment.

(S-95) Sensing and recording data by the at least one sensor during deployment.

(S-96) Recovering the fairing system alongside at least the tow cable.

(S-97) Capturing of the recorded data from each sensor.

(S-98) Uploading the recorded data into a computing device in order to calculate at least a tow cable catenary.

FIG. 9

APPARATUS AND METHOD FOR MEASURING SHAPE OF UNDERWATER TOW CABLES

STATEMENT OF GOVERNMENT INTEREST

The following description was made in the performance of official duties by employees of the Department of the Navy. The claimed subject matter, encompassing various example embodiments, may be manufactured, used, licensed by or for the United States Government for governmental purposes without the payment of any royalties thereon. Potential licensees may contact the Technology Transfer Office, NAVSEA Naval Surface Warfare Center, Carderock Division, 9500 MacArthur Ave., West Bethesda, MD 20817, USA.

FIELD

The following description relates generally to tow cables.

BACKGROUND

Fairings may be used on a cable when towing an element in a marine environment (e.g., surface, underwater). Fairings, such as ribbon, hairy, and hard fairings, are deployed to reduce strum and drag on the cables. Traditional methods to mount fairings vary based on the type of cable. In certain circumstances, it may be desirable to measure the shape of a tow cable and/or associated fairings during a towing operation.

Instrumentation may need to be installed on the fairings and/or tow cable in order to extract measurements. Under conventional technology, instrumentation installation may adversely impact performance of the fairings or create an undesired risk for the operators and/or users during installation.

For example, conventional instrumentation systems may only be installed midway through the deployment of a tow cable from a drum. This may increase the length of time of a launch operation. In addition, conventional instrumentation systems may be required to be installed on a tensioned tow cable. This may create an undesirable hazard for users and/or operators.

Optimal operation of the fairing may also be adversely impacted using conventional instrumentation approaches. For example, conventional approaches would remove entire fairing sections from a fairing system in order to allocate needed instrumentation. This would result in compromised hydrodynamic performance of the fairing during operation. Another conventional approach would be to attach instrumentation in the form of an in-line cable angle sensor. However, this approach may require significant modifications to a tow cable. The end result may be irreversible modifications on the fairing system and, again, compromised hydrodynamic performance.

SUMMARY

Example embodiments provide a cable measuring apparatus and method comprising a cable and a fairing system. The cable may be configured to be connected at opposite ends in a marine environment, wherein one connection provides a stabilizing force in order to allow the cable to form a catenary in response to the stabilizing force interacting with currents in the marine environment. The fairing system may be connected to the cable about its length, the fairing system comprising a plurality of fairing units, at least one of the plurality of fairing units being an instrumented replacement fairing unit. The instrumented replacement fairing unit may be configured to record measurements of at least the catenary when subjected to the stabilizing force.

Other features and advantages of the invention will become apparent to those skilled in the art upon examination of the following or upon learning by practice of the invention.

BRIEF DESCRIPTION OF DRAWINGS

The accompanying figures are included to provide a further understanding of example embodiments, and are incorporated in and constitute part of this specification. In the figures:

FIG. 9 is a method for measuring a shape of a tow cable using an instrumented replacement fairing unit according to example embodiments.

DETAILED DESCRIPTION

Figure 1:
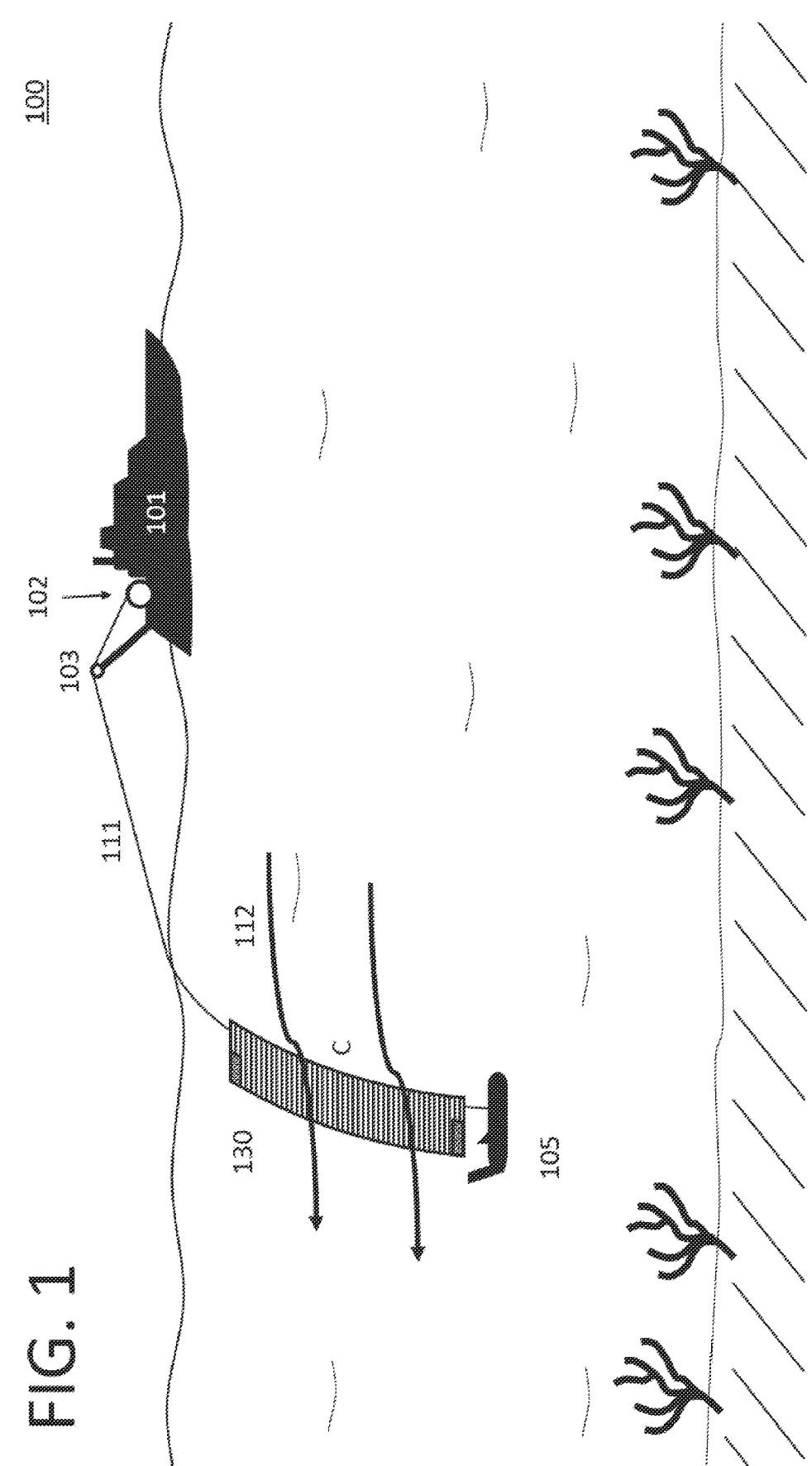
FIG. 1 is an operation of a cable shape measuring apparatus according to example embodiments.

In the following description, for purposes of explanation and not limitation, specific details are set forth such as particular structures, designs, techniques, etc., in order to provide a thorough understanding of the example embodiments. However, it will be apparent to those skilled in the art that the disclosed subject matter may be practiced in other illustrative embodiments that depart from these specific details. In some instances, detailed descriptions of well-known elements and/or method are omitted so as not to obscure the description with unnecessary detail. All principles, aspects, and embodiments, as well as specific examples thereof, are intended to encompass both structural and functional equivalents of the disclosed subject matter. Additionally, it is intended that such equivalents include both currently known equivalents as well as equivalents developed in the future.

The following description refers to an apparatus and method for measuring cable shape of underwater tow cables. However, it should be noted that the example embodiments shown and described herein are meant to be illustrative only and not limiting in any way. As such, various modifications will be apparent to those skilled in the art for application to other fields based on technologies other than the above, which may be in various stages of development and intended for future replacement of, or use with, the above described method or apparatus.

The goal of example embodiments is to measure the cable shape (catenary) of a tow cable. The tow cable may be used to tow an element—e.g., an underwater vehicle, sensing unit(s)—from a vehicle. The vehicle may be a vessel and/or an aircraft. The vessel may be a surface vessel and/or an underwater vessel. The tow cable may also be used to maintain a buoyant or high-lift element in a specific location that is moored to the seabed and subjected to a current. The tow cable may be an electro-mechanical cable. A portion of the tow cable may have a fairing to reduce drag or strumming while the remaining length of a cable remains bare. In such operations, it may be desired to measure the shape of the tow cable. For example, tow cable shape may be needed to validate cable simulations that are done during operation of the towed element. Instrumentation on a fairing system may be required to obtain such measurements. However, various hazards may exist during the installation of the instrumentation.

Under the current state of the art, deployment of a tow cable from a drum may be stopped midway through a launch operation in order to add instrumentation. The instrumentation may be necessary to extract measurements associated with the shape of a tow cable during a fairing operation. Pausing a launch operation to install instrumentation may increase the overall launch time. In certain circumstances, a delay in the launch time is undesirable.

Installing instrumentation to a tensioned tow cable may also be extremely dangerous to an operator and/or user. This hazard may be particularly acute if done before a hydraulic power unit (HPU) associated with the tow cable receives power. Proximity to a tensioned tow cable is not desired, as failure of a tow cable may cause serious bodily harm or death.

Example embodiments avoid the need to pause a launch operation in order install instrumentation. Example embodiments avoid this risk through the use of instrumented replacement fairing units.

FIG. 1 is an operation 100 of a cable shape measuring apparatus according to example embodiments. In this example embodiment, a vehicle 101 traversing a marine environment may include a cable spool 102 and a winch system 103. The vehicle 101 may be a surface vessel, a stationary marine vessel, a submersible vessel, or semi-submersible vessel. FIG. 1 depicts vehicle 101 as a surface vessel. The vehicle 101 may be autonomous and/or semi-autonomous. In some example embodiments, the vehicle 101 may be an airborne vehicle, such as an aircraft (e.g., helicopter, airplane, drone).

The spool 102 on vehicle 101 may provide a tow cable 111 that traverses the winch 103 and into the marine environment. The tow cable 111 may be connected to a towed element 105. The towed element 105 may be may be an underwater vehicle, a sensing unit, and/or a weight. The tow cable 111 may be segmented and/or a continuous line that is reeled from the spool 102.

The tow cable 111 may include a fairing system 130. The fairing system 130 may reduce strum and drag in the tow cable 111 as it towed across the marine environment—and through a current flow 112—by the vehicle 101. The fairing system 130 may be removable. The fairing system 130 may comprise hard fairings along the length of a segment of the tow cable 111. The hard fairing may be commercial off-the-shelf hard fairings or specifically designed hard fairings (e.g., additively manufactured) to address a specific need.

The fairing system 130 may include sensors to measure a cable catenary C. The fairing system 130 may be designed to permit quick installation and removal of the sensors from the sensor system in order to extract measured values concerning the cable catenary C. The cable catenary C is a curve that tow cable 111 may assume under its own weight when supported only at one or both of its ends in a uniform environment, such as a marine environment. Cable catenary C information is desirable in order to validate various measurements, such as speed and/or depth calculations. The measured information may also be used to iteratively measure mathematical coefficients.

The sensors in the fairing system 130 may record the measured information and thereafter be collected for data extraction. In some alternative example embodiments, the sensors may feed the data to a computing system in the vehicle 101, or to a remotely located computing system, in real time. The information extracted may be related to catenary C information.

Figure 2:
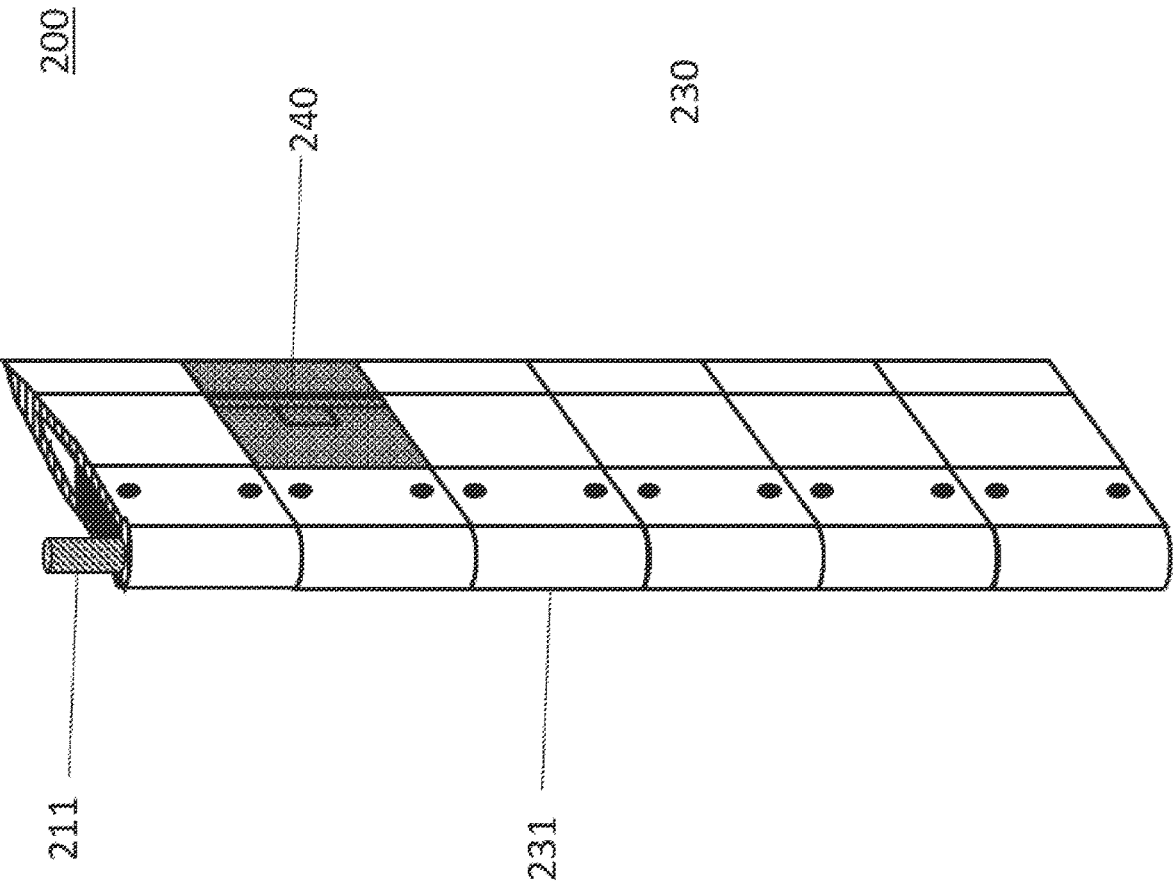
FIG. 2 is an illustration of a fairing system according to example embodiments.

FIG. 2 is an illustration 200 of a fairing system according to example embodiments. A fairing system 230 may include a plurality of fairing units 231. The fairing units 231 may be each connected to a tow cable 211. The plurality of fairing units 231 may be hard fairing units.

In illustration 200, one of the fairing units 231 may be an instrumented replacement fairing unit 240. The instrumented replacement fairing unit 240 may have an identical profile to the fairing units 231. In some example embodiments, the upper and lower fairing units from the plurality of fairing units 231 may each house an instrumented replacement fairing unit 240. In alternative example embodiments, there may be additional configurations of the instrumented replacement fairing unit 240 along the fairing system 230.

The instrumented replacement fairing unit 240 may contain instrumentation to measure various properties, such as an angle of the tow cable 211 and a depth of the fairing system 230 at a particular location. A position of the fairing units 231 along the tow cable 211 with respect to a cable scope may be known and/or measured as well. Measurements such as the angle, depth, and position of the fairing units 231 may facilitate a determination of a cable catenary. The instrumentation for performing said measurements may include a sensor that has a small form factor but also appropriate technical capabilities. The sensor may be a tilt sensor. The tilt sensor may be a specially developed and tailored tilt sensor. Alternatively, the tilt sensor may be a conventional and/or over-the-counter tilt sensor (e.g., STAR ODDI).

Example embodiments facilitate a safer installation and removal of instrumentation in a full scale fairing system 230 through the use of the instrumented replacement fairing unit 240. Use of the instrumented replacement fairing unit 240 avoids having to pause deployment of the tow cable 211 mid-process, after it has been tensioned. As a result, users and/or operators may avoid the undesired risk of installing instrumentation under said circumstances, which also reduces the overall time to deploy the system.

Figure 3:
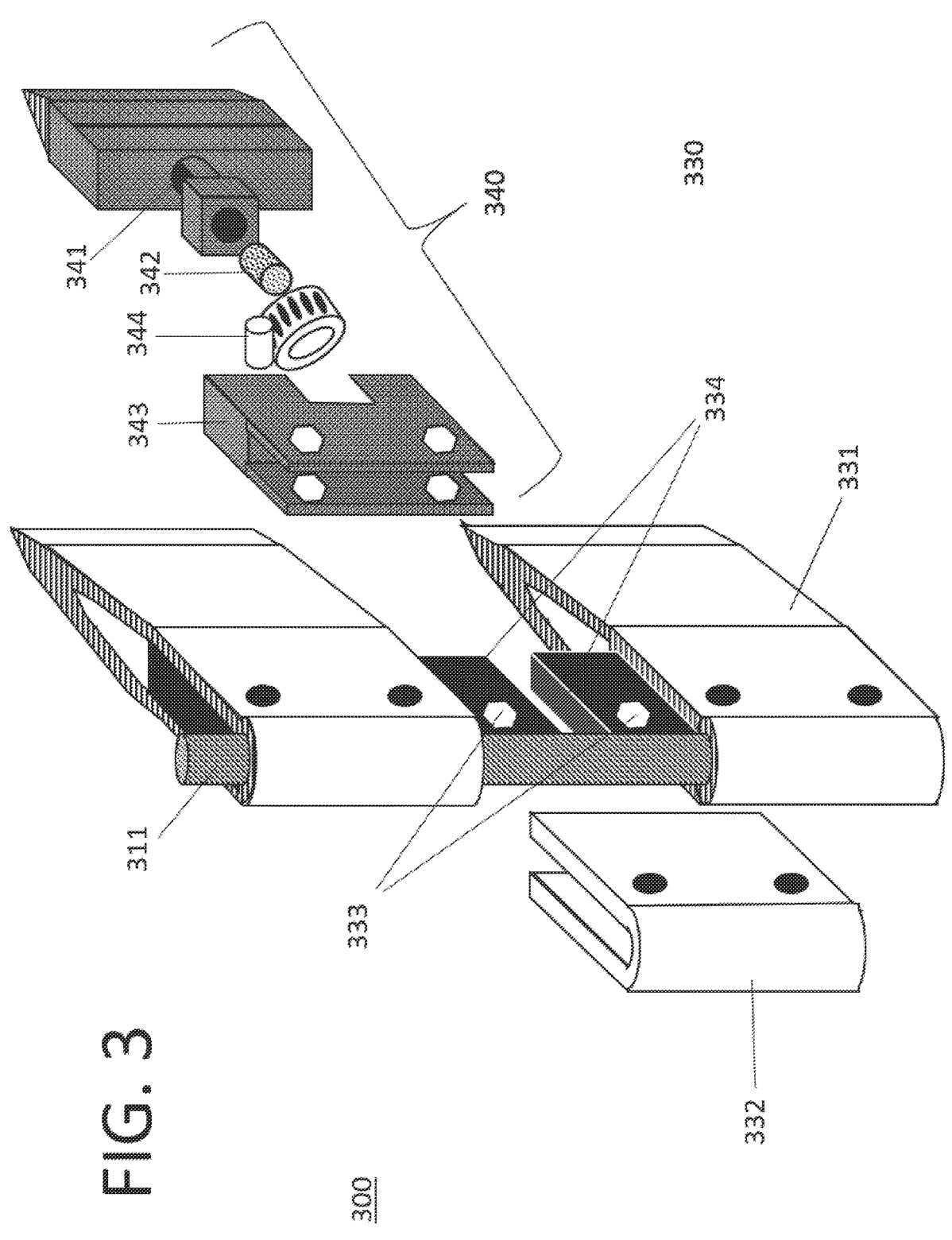
FIG. 3 is an exploded view of an instrumented replacement fairing unit according to example embodiments.

FIG. 3 is an exploded view 300 of instrumented replacement fairing unit according to example embodiments. In this view, a fairing system 330 may be connected to a tow cable 311. The fairing system 330 may include a plurality of fairing units 331. The component visualization 300 highlights the instrumented replacement fairing unit 340.

The instrumented replacement fairing unit 340 may have an identical profile to the fairing units 331. This may be realized through the repurposing of existing fairing units 331 to reflect the configuration of the instrumented replacement fairing unit 340. Alternatively, the constituent parts of the replacement fairing unit 340 may be produced using additive manufacturing processes (e.g., 3D printing).

At the component level, the instrumented replacement fairing unit 340 and all other fairing units 331, may have a fairing leading edge component 332 wrapping around the tow cable 311. The fairing leading edge component 332 may overlap with fairing tabs 334. The fairing tabs 334 may be situated along the length of the tow cable 311 in order to maintain the fairing system 330 in place. The fairing tabs 334 may also keep the plurality of fairing units 331 aligned to each other. The fairing tabs 334 may have different shapes and/or configurations.

The instrumented replacement fairing unit 340 may comprise a cable interface 343, a clamp 344, a sensor holder 341, and a sensor 342. The cable interface 343 may be mounted to the tow cable 311 in the same manner as the other fairing units 331. Once mounted, the cable interface 343 does not need to be removed.

The fairing tabs 334 may use connecting elements 333 to facilitate the mounting of the fairing leading edge component 332 and/or the cable interface 343 to the tow cable 311. In one example embodiment, the connecting element 333 may be plastic hex-head barrel nuts (e.g., two).

The sensor 342 may be mounted in the sensor holder 341. The sensor holder 341 may include an opening housing in which the sensor 342 can easily be installed and removed. The sensor holder 341 may be mounted to the aft surface of the cable interface 343. In another example embodiment, sensor 342 may be replaced with an explosive charge that could be activated via a time delay or remotely activated with an acoustic modem, in order to sever the tow cable 311 at that location, if desired for emergencies or payload release.

In one example embodiment, the mounting of the sensor holder 341 may be realized through the use of four (4) screws (e.g., socket head and/or flathead screws) that go in from trailing edge towards the cable interface 343. This may be accomplished, for example, by using standard stainless steel hex nuts adhered to the cable interface 343 in order to receive the four screws coming from the sensor holder 341. The standard hex nuts may be adhered using epoxy.

In another example embodiment, the mounting of the sensor holder 341 may be realized through anti-rotation guide channels for the hex nuts-instead of epoxy. More specifically, rectangular holes with a width and height dimensions similar to that of four hex nuts may be located in the cable interface 343. The anti-rotation guide channels are centered along respective screw holes. Sliding a hex nut into one of these channels, the hex nut aligns with its respective screw and cannot rotate when torqued, as the walls of the cable interface 343 would restrict its motion.

The sensor 342 may be held in place by the clamp 344. The sensor 342 may be a standalone tilt sensor. The sensor 342 may be configured to measure and/or record temperature, pressure, and/or acceleration. Said measurements and/or recordings may be derived in three directions relative to the earth's gravity. The measurements may be recorded in a data logger embedded within the sensor 342. The measurements and/or recordings may be retrieved by placing the sensor 342 in a communication box to download the data to a computer.

Operation of the instrumented replacement fairing unit 340 commences with the calibration of the sensor 342 prior to deployment of the fairing system 330. Before the launch of a towed element, the sensor 342 may be setup with a timestamp and sampling frequency. After this is done, the sensor 342 may be placed in the sensor holder 341 and aligned with a vertical axis. The sensor 342 may have a reference line to facilitate alignment. The clamp 344 may be placed over the sensor 342 and the sensor holder 341 to prevent movement of the sensor 342 during operation.

The sensor holder 341 may then be taken to a cable drum and secured into the cable interface 343 as previously described with the aid of screws (e.g., four screws). A towed element may be deployed thereafter, alongside the fairing system 330. Upon recovery of the towed element and associated fairing system 330, the sensor holder 341 can be removed from the drum and the data downloaded.

Figure 4:
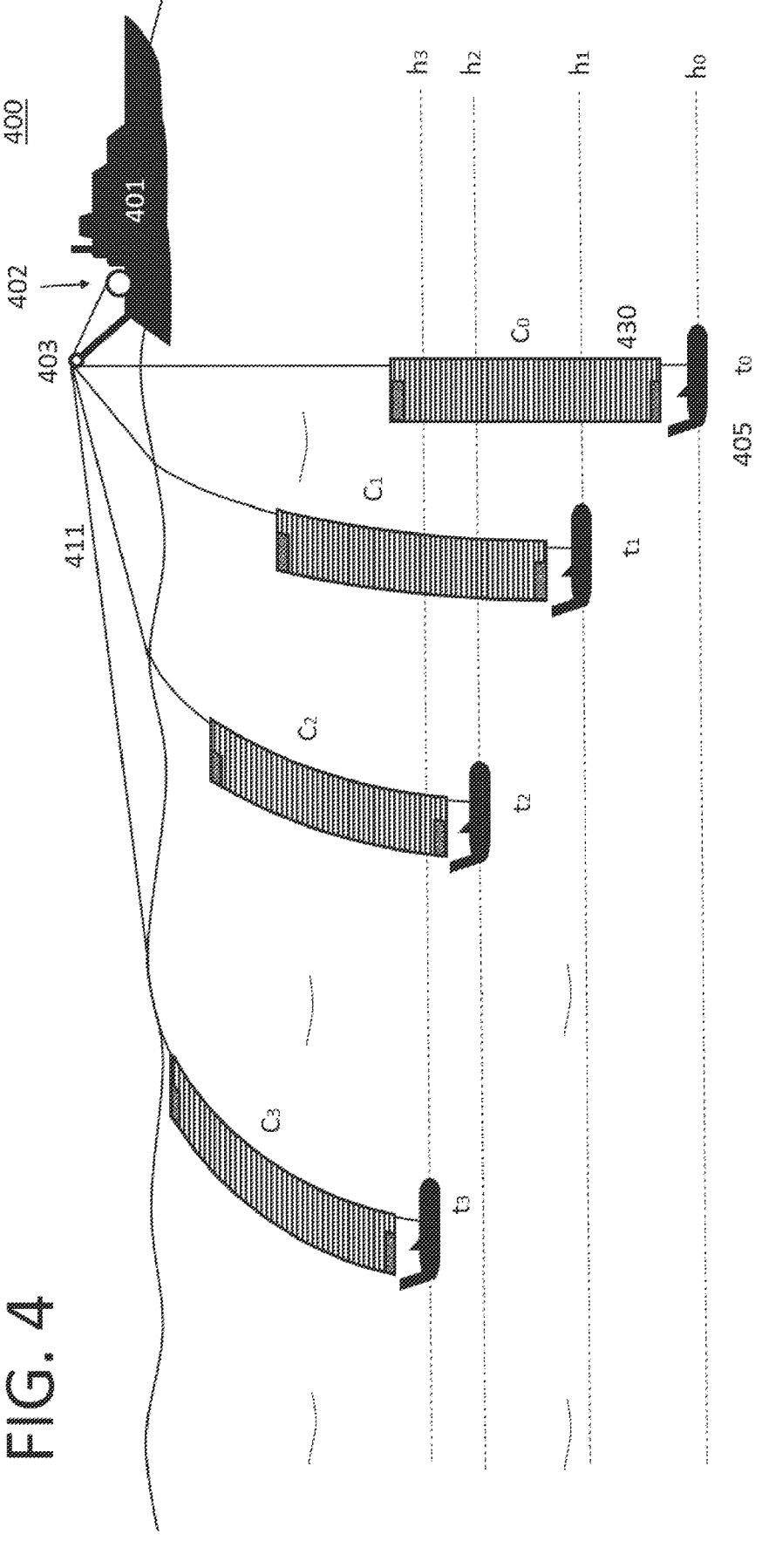
FIG. 4 is operation stages of a cable shape measuring apparatus according to example embodiments.

FIG. 4 illustrates operation stages 400 of a cable shape measuring apparatus according to example embodiments. The operations may be performed on a vehicle 401. The vehicle 401 may be a vessel and/or an aircraft. FIG. 4 depicts vehicle 401 as a surface vessel. A tow cable 411 may emanate from a cable spool 402. The tow cable 411 may traverse a winch system 403 and then enter a marine environment. The marine environment may be an ocean, river, or lake. The tow cable 411 may move a towed element 405 about the marine environment. A fairing system 430 may be connected to the tow cable 411.

Operation stages 400 depict a fairing system 430 at four time intervals: $t_0$, $t_1$, $t_2$, and $t_3$. At each time interval, the vehicle 401 is providing a different degree of force on the tow cable 411 corresponding with a towing velocity. There is a corresponding change in a catenary C of the tow cable 411. The operation stages 400 illustrate how sensors in an instrumented replacement fairing unit within the fairing system 430 will take different measurements at each hypothetical time interval.

For example, a rest state is depicted by time interval to. At this time interval, there is no force on the tow cable 411. This corresponds to a rest cable catenary $C_0$—that has no curvature. Correspondingly, the towed element 405 may be at a rest position $h_0$. Absence of a towing velocity on the tow cable 411 amounts to a maximal rest position $h_0$ in a vertical axis relative to the vehicle 401. The sensors in instrumented replacement fairing units of the fairing system 430 may collect these measurements during deployment of the towed interval.

At a first time interval $t_1$, vehicle 401 may provide an initial amount of force on the tow cable 411 due to forward motion of the vehicle 401. The forward motion of the vehicle 401 may provide a towing velocity. This may result in some curvature of the tow cable 411, which will be reflected by first cable catenary $C_1$. This may also lead to an initial displacement from the rest position $h_0$, resulting in a first position $h_1$ of the towed element 405 along the vertical axis.

Similarly, at a second time interval $t_2$, the vehicle 401 may provide a greater amount of force on the tow cable 411 due to an increased velocity of the vehicle 401. This may result in increased curvature of the tow cable 411, which will be reflected by second cable catenary $C_2$. This may result in the towed element 405 being in a second position $h_2$ along a vertical axis. The second position $h_2$ of the towed element 411 may be at an increased displacement from the rest position $h_0$, as well as from the first position $h_1$.

At a third time interval $t_3$, the vehicle 401 may provide a maximum amount of force on the tow cable 411 when the vehicle 401 is at its maximum towing velocity. This may result in a maximum curvature on the tow cable 411, as reflected by third cable catenary $C_3$. This may also result in the towed element 405 being in a third position $h_3$ along a vertical axis, with a maximum amount of displacement.

Figure 5:
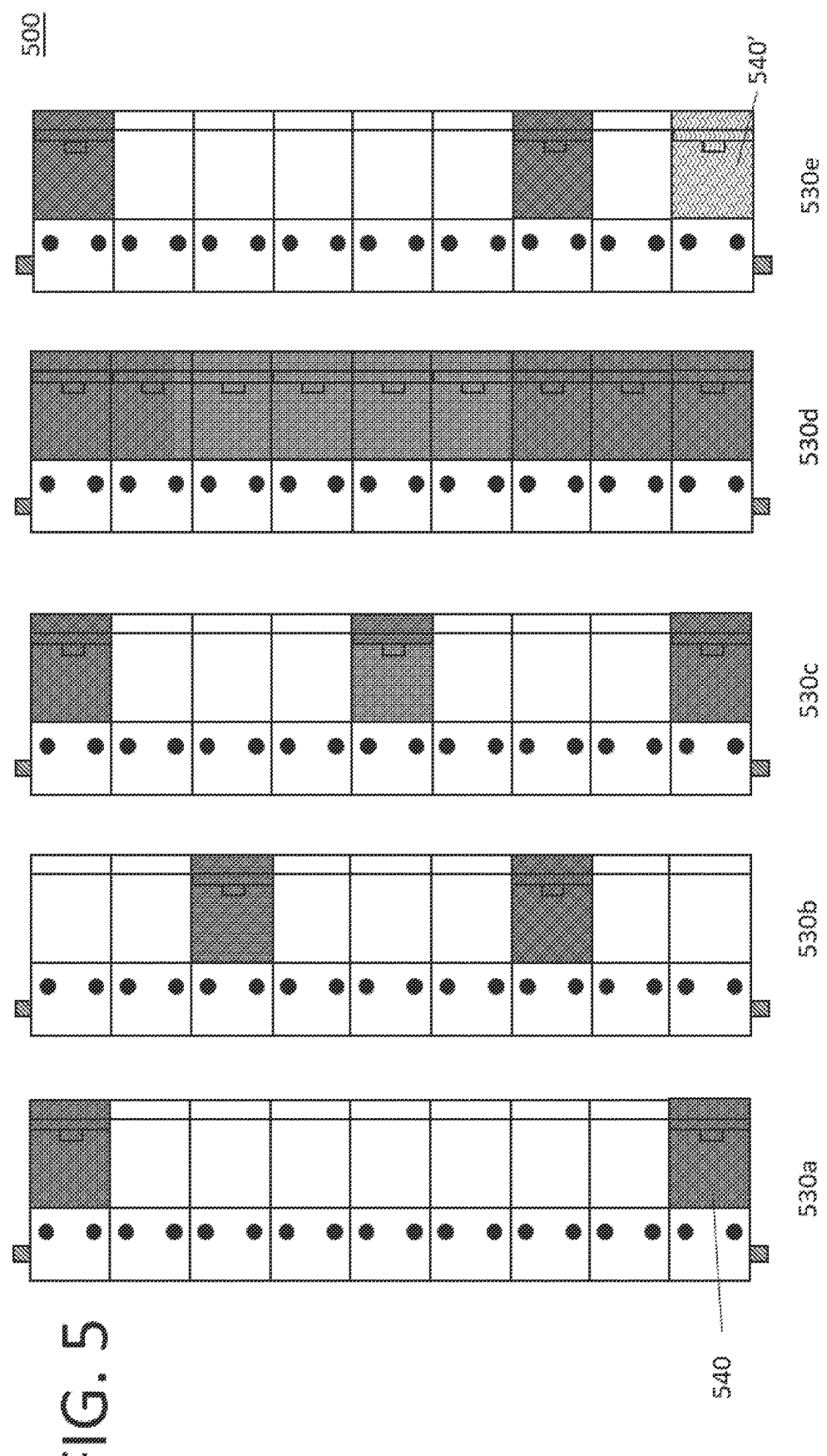
FIG. 5 is an illustration of fairing systems according to various example embodiments.

FIG. 5 is an illustration 500 of fairing systems according to various example embodiments. These example embodiments are merely illustrative and are not exhaustive illustrations. For example, all the example embodiments in illustration 500 have nine (9) fairing units. A fairing system, according to example embodiments, may have more or less than nine fairing units.

A fairing system 530a according to a first example embodiment may have an instrumented replacement fairing unit 540 at opposite ends of the system. This may maximize the captured curvature readings about a tow cable.

A fairing system 530b according to a second example embodiment may also have an instrumented replacement fairing unit 540 at opposite ends, but minimize the distance between each. This approach may be preferable in situations where the fairing units at the extremities may be subject to increased turbulence. The turbulence may adversely impact the instrumentation or structure of the instrumented replacement fairing unit 540, so it may be desirable to avoid placing in the extremities.

A fairing system 530c according to a third example embodiment may use three (3) instrumented replacement fairing units 540. The use of three instrumented replacement fairing units 540 may provide a more granular measurement of the catenary of the tow cable. Even so, a fairing system 530d according to a fourth example embodiment may simply replace all the fairing units with instrumented replacement fairing units 540. This approach may provide the most granular amount of readings along the length of the tow cable.

A fairing system 530e according to a fifth example embodiment may also have an instrumented replacement fairing unit 540 at opposite ends, but with at least one modified instrumented replacement fairing unit 540'. The modified instrumented replacement fairing unit 540' may have an explosive charge positioned within the sensor holder, in lieu of a sensor.

The modified instrumented replacement fairing unit 540' may be situated above a towed element. The towed element may be quickly cut from the tow cable in an emergency situation via a remote trigger detonating the explosive charge in the modified instrumented replacement fairing unit 540'. The remote trigger may be an acoustic trigger. The fairing system 530e may allow the towed element to float to the surface and the tow cable to be winched in and retrieved. The fairing system 530e, and its instrumentation, may be collected alongside the tow cable. In alternative example embodiments, the modified instrumented replacement fairing unit 540' may be situated below the tow cable being pulled by the vehicle.

Use of the explosive charge in the modified instrumented replacement fairing unit 540' may be needed as a result of contrasting buoyancy between the towed elements and a tow cable. Typically, towed elements are positively buoyant and tow cables are negatively buoyant. If the towed element and tow cable were both released from a towpoint on a vehicle during an emergency, the result would be an overall negative buoyancy of the released elements. This would cause a total loss of both the towed element and the tow cable. The modified instrumented replacement fairing unit 540' is designed to prevent such a scenario from materializing. The modified instrumented replacement fairing unit 540' could also be used to strategically deploy a payload, or to sever the tow cable in an emergency situation. The tow cable may such become caught on flotsam, another vehicle (particularly another vessel), other debris, or on the seabed. Otherwise, the entire towed system may have to be released at the vehicle or could cause damage to the vehicle or winching system. Having the explosive charge housed in the same location as the sensor within the modified instrumented replacement fairing unit 540' allows the explosive charge to be protected from ambient conditions as well as cable conditions, such as drag and vibration.

Figure 6:
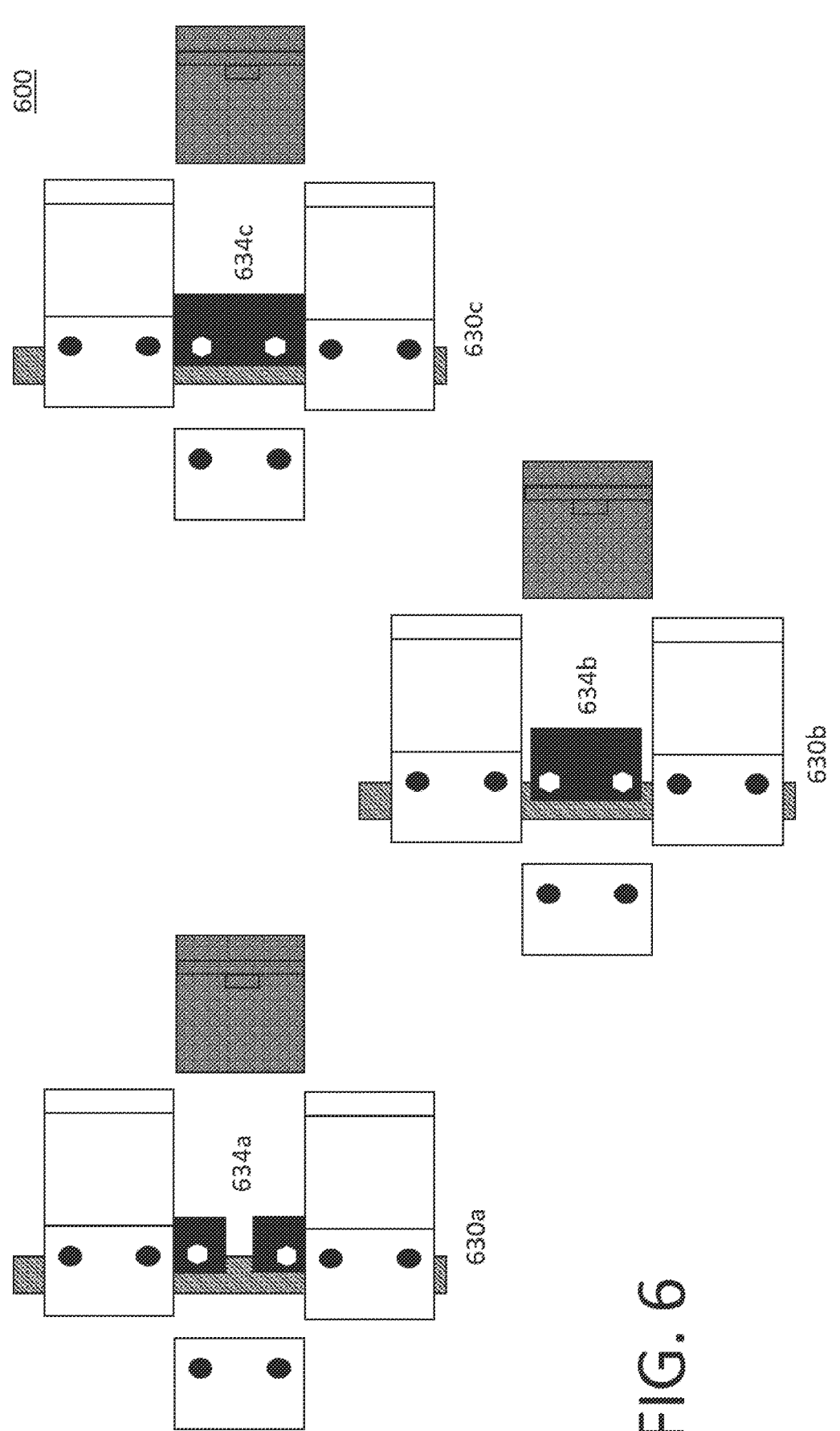
FIG. 6 is fairing tab structures of fairing systems according to various example embodiments.

FIG. 6 is fairing tab structures 600 of fairing systems according to various example embodiments. A fairing system 630a according to a first example embodiment may comprise a fairing tab 634a. The structure of fairing tab 634a permits an extension from each of the directly adjacent fairing units. In this example embodiment, the instrumented replacement fairing unit may be aligned and connected to adjacent fairing units via the fairing tab 634a. Alternatively, fairing system 630b according to a second example embodiment provides for independent fairing tabs 634b. In contrast, fairing system 630c according to a third example embodiment provides a single continuous fairing tab 634c running through the length of a tow cable.

Figure 7:
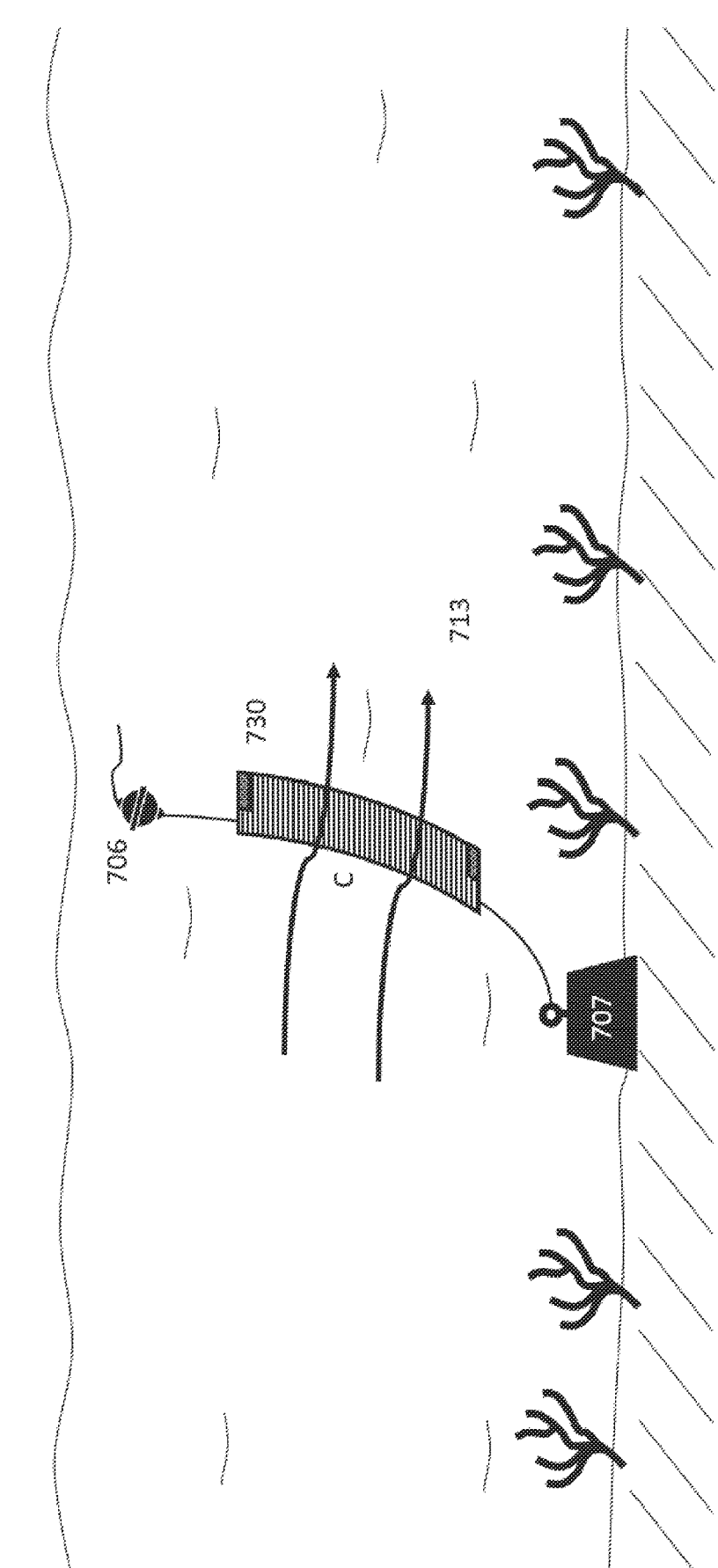
FIG. 7 is an alternative operation of a cable shape measuring apparatus according to example embodiments.

FIG. 7 is an alternative operation 700 of a cable shape measuring apparatus according to example embodiments. In this example embodiment, there is no tow cable providing a force to a fairing system 730. Instead, the arrangement is flipped vertically such that a pseudo-towpoint may be defined by a fixed location on the seabed. The fixed location may be an anchoring element 707. The anchoring element 707 may be moored to be stationary.

At an opposite end may be a buoyant element 706. The buoyant element 706 would need to provide significant buoyancy/lift to be able to support the weight of the fairing system 730, while at the same time allowing the anchoring element 707 to be moored and stationary.

A cable catenary C in the fairing system 730 may develop when the cable is subjected to an ambient current 713. The ambient current is different to previously discussed current flows caused by a towing velocity of a vehicle. Ambient current 713 may strictly be ocean current, for example.

The sensors of the fairing system 730 may perform the same measurements as previously discussed. In this example embodiment, the recorded information may be captured by either physically removing the fairing system 730 from its moored position, or by using a near-proximity sensing element.

Figure 8:
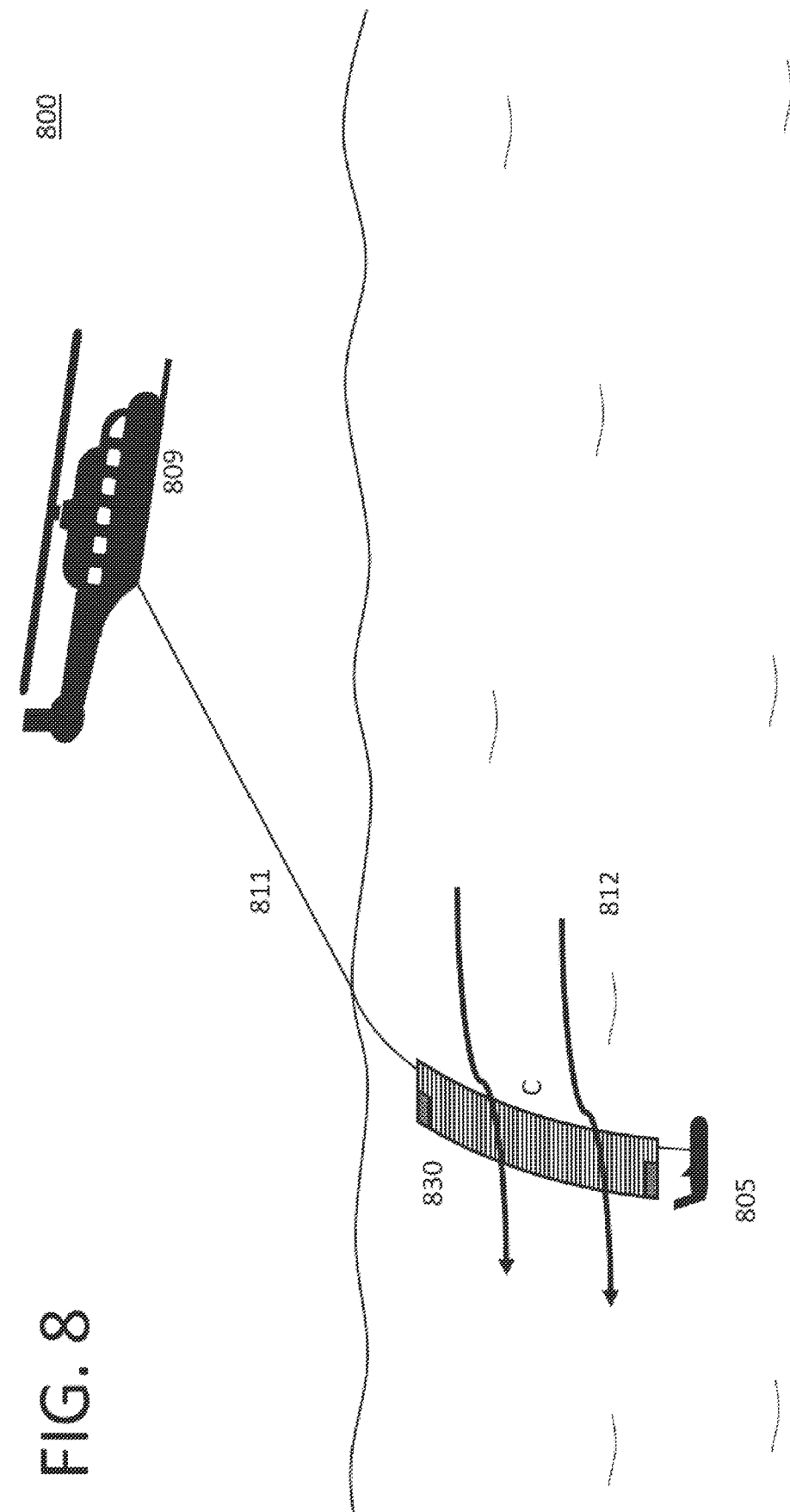
FIG. 8 is another alternative operation of a cable shape measuring apparatus according to example embodiments.

FIG. 8 is another alternative operation 800 of a cable shape measuring apparatus according to example embodiments. In this example embodiment, a vehicle traversing a marine environment may comprise an aircraft 809. More particularly, aircraft 809 may be a helicopter. In alternative embodiments, the aircraft 801 may be an airplane and/or a drone. The aircraft 809 may be autonomous and/or semi-autonomous.

A tow cable 811 may emanate from the aircraft 809. The aircraft 809 may include within a spool and a winch (not illustrated) that allow the tow cable 811 to be reeled from an aerial setting.

The tow cable 811 may include a fairing system 830. One end of the tow cable 811 may be connected to a towed element 805. The fairing system 830 may reduce strum and drag in the tow cable 811 as it towed across the marine environment, and through a current flow 812, by the aircraft 809. The fairing system 830 may be removed from the aircraft 809 by either a disconnection at the location of the tow cable 811 winch or at the location of the fairing system 830.

The fairing system 830 may include sensors to measure a cable catenary C. The fairing system 830 may be designed to permit quick installation and removal of the sensors from the sensor system in order to extract measured values concerning the cable catenary C.

FIG. 9 is a method S-90 for measuring a shape of a tow cable using an instrumented replacement fairing unit according to example embodiments. The method begins with (S-91) calibrating at least one sensor prior to deployment of a fairing system. This may include including setup of a timestamp and sampling frequency in the sensor. Next is (S-92) placing each of the at least one sensor on corresponding sensor holder and fastening in place with a clamp. The sensor may be aligned with a vertical axis through the use of a reference line. The sensor holder may then be (S-93) mounted on a cable interface of an instrumented replacement fairing unit in the fairing system. The fairing system is then ready to be (S-94) deployed alongside a tow cable and a towed element into a marine environment. During deployment, the at least one sensor (S-95) senses and records data.

After successful deployment, the next step is (S-96) recovering the fairing system alongside at least the tow cable. In most circumstances, the towed element will also be recovered. Next is (S-97) capture of the recorded data from each sensor. The capture of the recorded data may be accomplished either by the physical removal of each sensor from their corresponding sensor holders, or use of a near-proximity sensing element to download the recorded data. Finally, the captured recorded data is (S-98) uploaded into a computing device in order to calculate at least a tow cable catenary.

The example embodiments being thus described, it will be obvious that the same may be varied in many ways. Such variations are not to be regarded as a departure from the disclosed subject matter, and all such modifications are intended to be included within the scope of the disclosed subject matter.

What is claimed is:

1. A cable measuring apparatus comprising:
 a cable configured to be connected at opposite ends in a marine environment, wherein one connection provides a force amount in order to allow the cable to form a catenary in response to the stabilizing force interacting with currents in the marine environment; and
 a fairing system connected to the cable about its length, the fairing system comprising a plurality of fairing units, at least one of the plurality of fairing units being an instrumented replacement fairing unit,
 wherein the instrumented replacement fairing unit is configured to record measurements of at least the catenary when subjected to the force amount.

2. The cable measuring apparatus of claim 1, wherein the cable is configured to be connected at one end to a vehicle and at another end to a towed element,
 wherein the force amount is provided by the vehicle moving at a towing velocity in order to tow the towed element, wherein the cable forms a catenary in response to the towing velocity.

3. The cable measuring apparatus of claim 1, the instrumented replacement fairing unit comprising:
 a sensor configured to record the measurements of at least the catenary when subjected to the force amount;
 a sensor holder configured to removably house the sensor; and
 a clamp configured to fix the sensor in the sensor holder.

4. The cable measuring apparatus of claim 3, wherein the recorded measurements include at least one of an angle of the cable, a depth of the fairing system, and a position of at least one fairing unit.

5. The cable measuring apparatus of claim 3, wherein the sensor is configured to be secured in the sensor holder prior to the deployment of the towed element, and is further configured to be removed from the sensor holder after operation of the towed element.

6. The cable measuring apparatus of claim 3, wherein the sensor is configured to allow the recorded measurements to be captured by an external device and uploaded to a computer.

7. The cable measuring apparatus of claim 6, wherein the recorded measurements are captured by at least one of physically removing the sensor from the instrumented replacement fairing unit, and using a near-proximity sensing element without physical removal of the sensor from the instrumented replacement fairing unit.

8. The cable measuring apparatus of claim 3, the instrumented replacement fairing unit further comprising:
 a cable interface removably connected to the sensor holder and configured to be mounted on a fairing system via a connecting element with at least one fairing tab; and
 a fairing leading edge connected to the fairing tabs and wrapping around the cable, wherein the fairing leading edge is situated along the length of the cable in order to maintain the fairing system in place,
 wherein the instrumented replacement fairing unit has the same profile as one of the plurality of fairing units.

9. The cable measuring apparatus of claim 8, wherein the connecting element removably connecting the cable interface comprises plastic hex-head barrel nuts.

10. The cable measuring apparatus of claim 8, wherein the sensor holder is connected to an aft surface of the cable interface by screws secured through at least one fixed receptacles.

11. The cable measuring apparatus of claim 10, wherein the at least one fixed receptacles are hex nuts adhered by epoxy.

12. The cable measuring apparatus of claim 10, wherein the at least one fixed receptacles are hex nuts situated within anti-rotation guide channels.

13. The cable measuring apparatus of claim 1, further comprising:
 a modified instrumented replacement fairing unit configured to explode in lieu of recording measurements, the modified instrumented replacement fairing unit comprising an explosive charge configured to be detonated remotely and sever the cable.

14. The cable measuring apparatus of claim 1, wherein the cable is configured to be connected at an anchoring element and at another end to a buoyant element,
 wherein the buoyant element provides a positive buoyancy on the fairing system, and
 wherein the stabilizing force is provided by the anchoring element interacting with an ambient current, wherein the cable forms a catenary in response to the ambient current.

15. The cable measuring apparatus of claim 1, wherein the cable is configured to be connected at one end to a vehicle, wherein the vehicle is one of an aircraft and a vessel.

16. A method for measuring a shape of a tow cable comprising:
 calibrating at least one sensor, including setup of a timestamp and sampling frequency, prior to deployment of a fairing system;
 placing each of the at least one sensor on corresponding sensor holder and fastening in place with a clamp;
 mounting the sensor holder on a cable interface of an instrumented replacement fairing unit in the fairing system;
 deploying the fairing system alongside a tow cable and a towed element into a marine environment;

sensing and recording data by the at least one sensor during deployment;

recovering the fairing system alongside at least the tow cable;

capturing of the recorded data from each sensor; and uploading the recorded data into a computing device in order to calculate at least a tow cable catenary.

17. The method for measuring a shape of a tow cable in claim 16, wherein the capturing step comprises at least one of physically removing the at least one sensor from the instrumented replacement fairing unit, and using a near-proximity sensing element without physical removal of the at least one sensor from the instrumented replacement fairing unit.

\*    \*    \*    \*    \*